United States Patent [19]

Slater et al.

[11] 4,385,313
[45] May 24, 1983

[54] UNITARY OPTICAL ASSEMBLY FOR PROJECTION TELEVISION RECEIVER

[75] Inventors: Robert E. Slater, Vernon Hills; Meyer L. Sugarman, Northbrook, both of Ill.

[73] Assignee: Zenith Radio Corporation, Glenview, Ill.

[21] Appl. No.: 238,861

[22] Filed: Feb. 27, 1981

[51] Int. Cl.[3] .................. H04N 5/74; H04N 5/64; H04N 9/31

[52] U.S. Cl. ................................ 358/60; 312/7.2; 358/55; 358/237; 358/250; 358/254

[58] Field of Search .............. 358/55, 60, 250, 254, 358/255, 237, 231; 312/7 TV

[56] References Cited

U.S. PATENT DOCUMENTS 2,299,393 10/1942 Johnson et al. .............. 358/250 X

FOREIGN PATENT DOCUMENTS

1134279 4/1957 France ........................ 358/250

*Primary Examiner*—Robert L. Richardson

[57] ABSTRACT

Unitary optical assembly means is disclosed for use in an ultra-compact projection television receiver. The unitary optical assembly means is selectively storable in the receiver cabinet and elevatable therefrom by precision elevating means. The receiver includes a stationary optical assembly means permanently enclosed in the lower portion of the cabinet for forming a television image and projecting, when the unitary optical assembly is elevated an aerial image of the television image upwardly a predetermined image projection distance along an optical path folded by optical path folding means. The unitary optical assembly comprises in combination mirror means arranged at a predetermined angle effective to receive the aerial image and reflect the image forwardly. The unitary optical assembly also comprises rear projection screen means located at the terminus of the optical path and vertically arranged for receiving said aerial image reflected by the mirror means for displaying the image. A rigid, box-like shroud means provides for mounting the mirror at a predetermined angle and in a predetermined fixed relationship to the screen. The unitary optical assembly according to the invention provides for maintaining the mirror and the screen in predetermined fixed relationship one with the other, and when said unitary optical assembly is elevated, the assembly provides for establishing and maintaining the mirror and the screen in predetermined fixed relationship with the stationary optical assembly means.

3 Claims, 9 Drawing Figures

UNITARY OPTICAL ASSEMBLY FOR PROJECTION TELEVISION RECEIVER

CROSS-REFERENCE TO RELATED APPLICATIONS

This application is related to but in no way dependent upon copending applications of common ownership herewith including: Ser. No. 228,434 filed Jan. 26, 1981 and Ser. No. 235,059 filed Feb. 17, 1981 and now U.S. Pat. No. 4,358,792.

BACKGROUND OF THE INVENTION AND PRIOR ART DISCLOSURES

This invention concerns television systems, and is particularly directed to a system in which a rear projection screen, storable in the system cabinet, is elevatable for viewing.

A system of this type is described and fully claimed in referent copending application Ser. No. 228,434. A jack-in-the-box projection television receiver comprises cabinet means for enclosing the components of the receiver, and includes lid means hinged at the back of the cabinet. The receiver comprises vertically arranged, elevatable rear projection screen means selectively storable in the cabinet. Image source means provides for forming a television image. Stationary projection means provide for projecting an aerial image of a television image formed by the image source means along a folded optical path onto the screen means when the optical path is erected and the screen means is located a predetermined image projection distance from the source means. The receiver further includes means for elevating the screen from a first receiver-inoperable position wherein the screen means is completely enclosed within the cabinet and the receiver is ultra-compact, to an elevated receiver-operable position wherein the screen means is emerged from the cabinet. As a result, the optical path is extended to a length equal to the predetermined image projection distance whereby the projection image is coincident with the screen.

The present invention provides for a unitary optical assembly which includes the elevatable rear projection screen means and ancillary components for use in the aforedescribed referent copending application Ser. No. 228,434.

OBJECT OF THE INVENTION

It is the object of this invention to provide a unitary optical assembly including rear projection screen means that is storable in and elevatable from the cabinet of the projection television receiver described and claimed in referent copending application Ser. No. 228,434.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

Figure 1A:
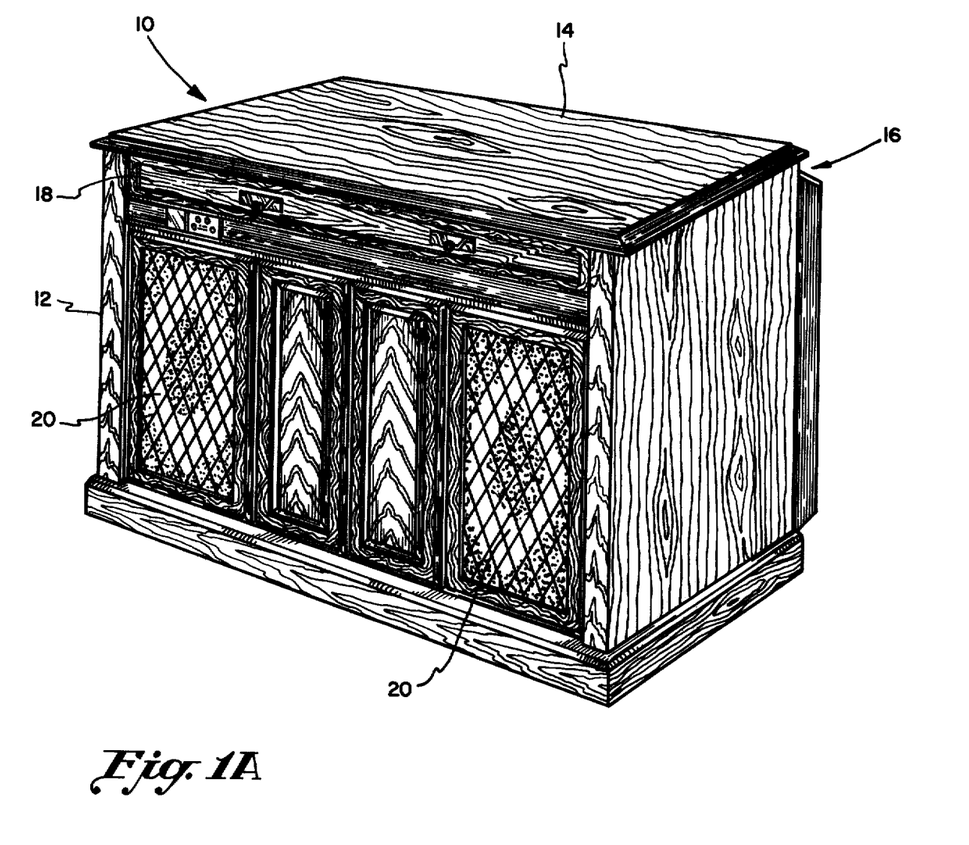
FIGS. 1A and 1B are oblique views in perspective of a projection television receiver according to the invention described and claimed in referent copending application Ser. No. 228,434. There is depicted, respectively, a first, receiver-inoperable position; and a second, receiver-operable position wherein a rear projection screen is elevated from the receiver cabinet for viewing.

An ultra-compact jack-in-the-box projection television receiver 10 according to the invention disclosed in referent copending application Ser. No. 228,434 is shown by FIG. 1A. The receiver comprises cabinet means 12 for housing the components of the receiver. Cabinet 12 includes lid means 14 attached to the back of the cabinet and pivoted by a hinge 16 which may comprise a piano hinge, for example. The lid 14 may have an overhanging control panel cover 18 for covering a receiver control panel. Grilled aperture ports 20 provide for audio emission from concealed speakers of, for example, a stereo sound system.

Figure 1B:
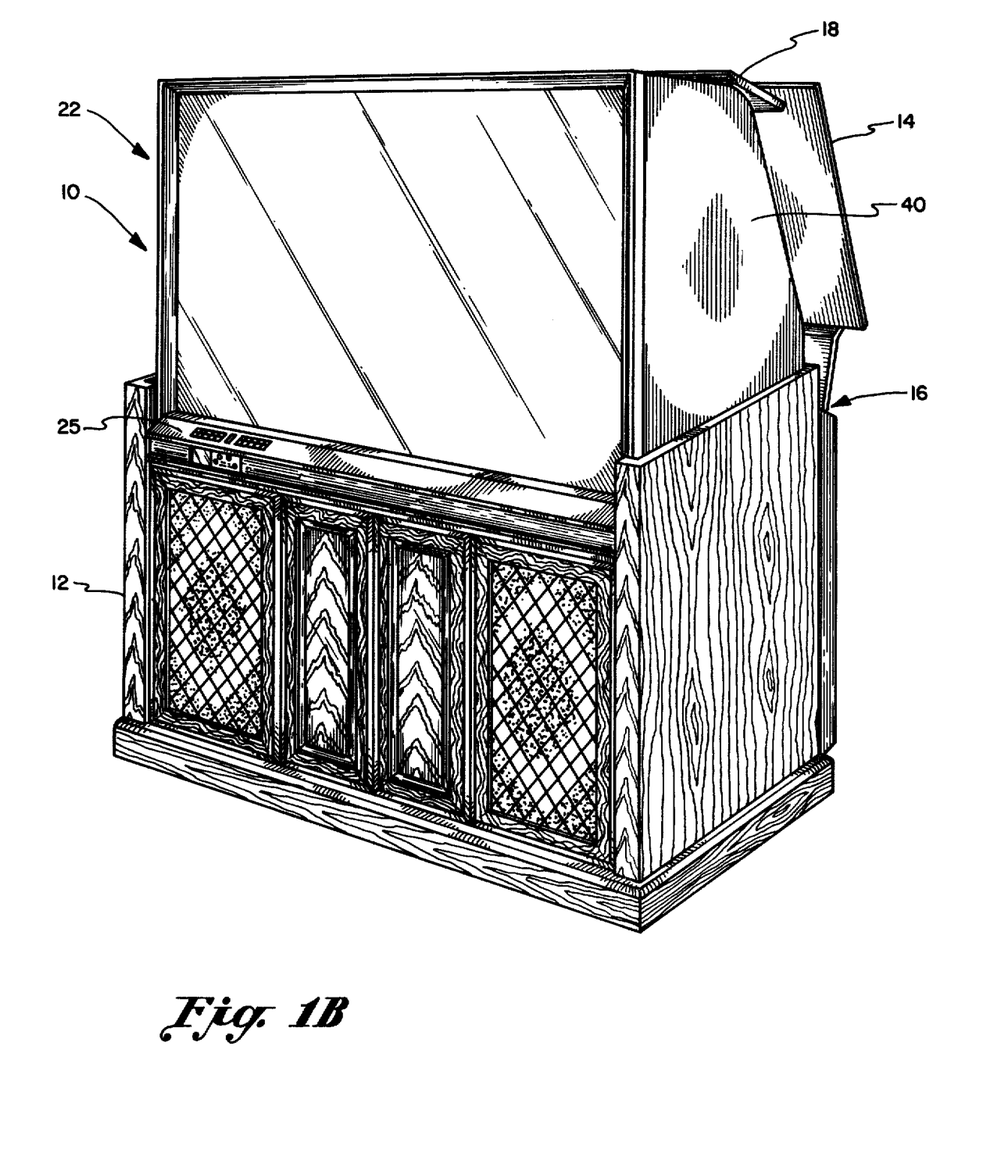

With reference now to FIG. 1B, lid 14 is shown as being raised and the unitary optical assembly means 22 according to the invention is shown as being emerged from cabinet means 12. Control panel 25, which may include all standard front panel controls such as controls for channel selection, audio volume, and various chromatic controls, is exposed by the raising of control panel cover means 18 when lid 14 is raised. Control panel cover 18 may be hingedly dependent from lid 14, as indicated.

Figure 2:
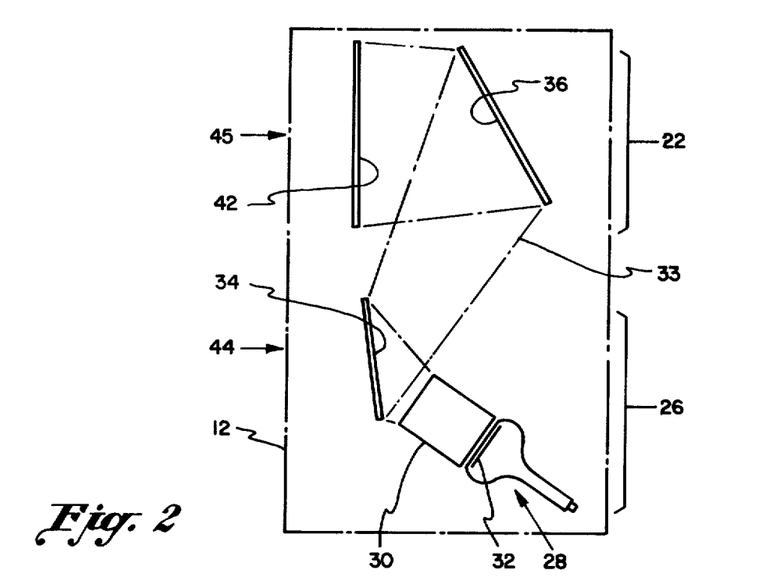
FIG. 2 is a schematic view of the components of the optical path of the receiver in relation to the receiver cabinet, depicted as an outline.
Figure 3:
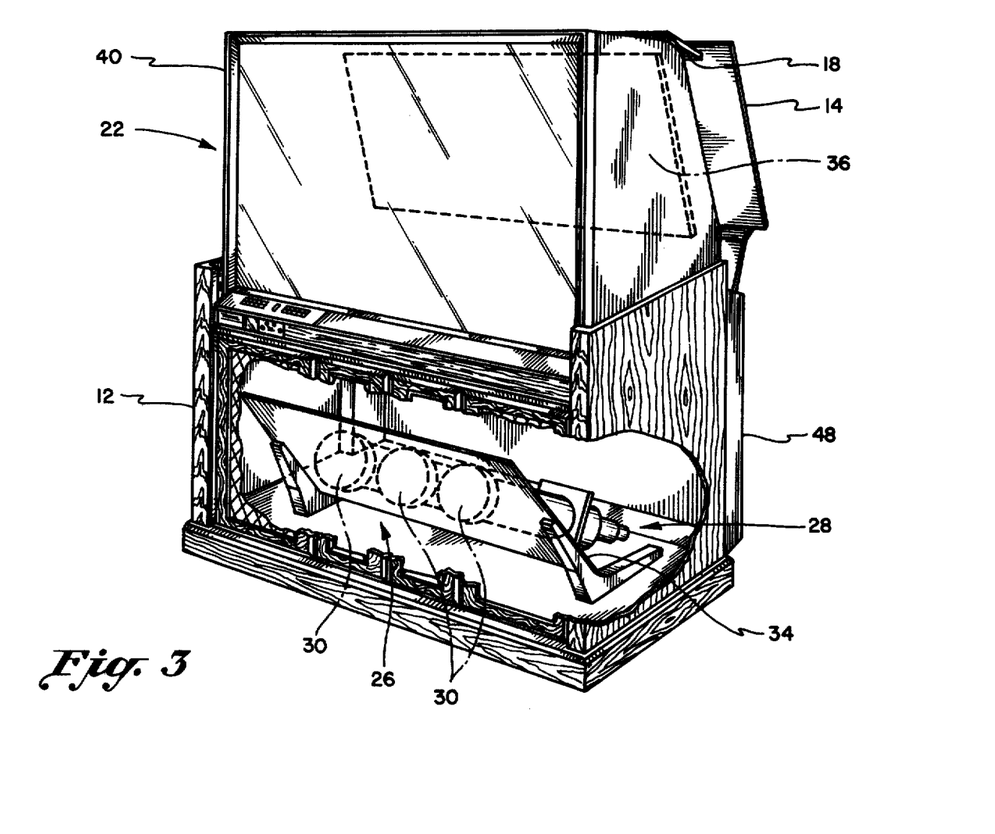
FIG. 3 is an oblique view in perspective depicting a receiver with screen elevated and with the receiver cabinet partially cut away to depict the relationship of major components.

The major components comprising the television receiver 10 are depicted schematically in FIG. 2 and in a cutaway perspective view in FIG. 3. A stationary optical assembly means 26, indicated by a bracket in FIG. 2, is permanently enclosed in a lower portion of cabinet 12 as indicated. Stationary optical assembly 26 includes a television image source means for forming a television image. The television image source means is indicated as comprising three cathode ray tubes 28 which may form, respectively, a red, green or blue image for projecting in conjunction with associated projection lenses 30, and when the unitary optical assembly is elevated, an aerial image of the television image upwardly a predetermined projection image distance along an optical path 33 folded by optical path folding means. A television image 32 is depicted in FIG. 2 as being formed on the cathodoluminescent screen of one of the cathode ray tubes. The stationary optical assembly 26 includes a first mirror means 34, which provides for receiving the aerial image and reflecting the image upwardly.

The unitary optical assembly means 22, according to the invention is selectively storable in cabinet 12, and elevatable therefrom. With specific reference to FIGS. 4A and 4B, the unitary optical assembly is depicted as comprising the following, in combination. Mirror means 36, (a "second" mirror means), is arranged at a predetermined angle effective to receive the aforedescribed aerial image, and reflect the image forwardly.

Figure 4A:
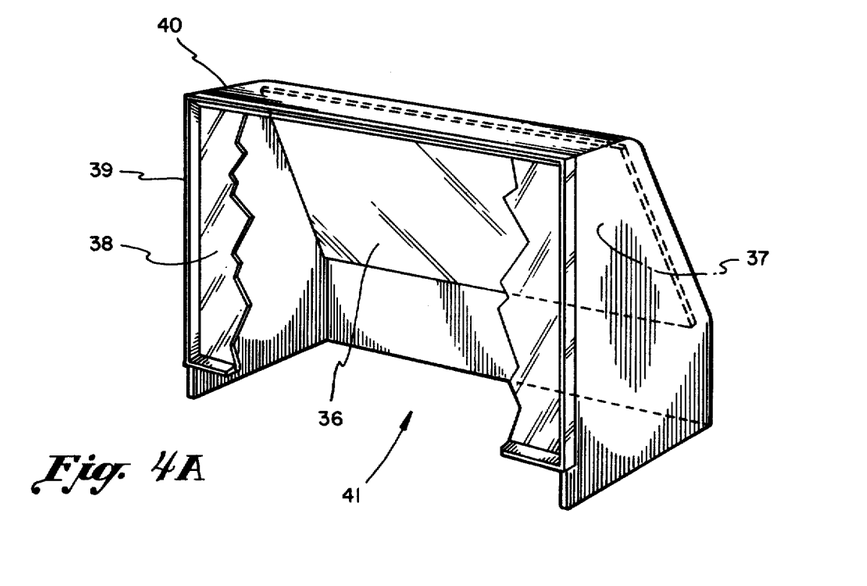
FIG. 4A is a front oblique view in perspective of the unitary optical assembly according to the invention with the viewing screen partly cut away to show internal construction.
Figure 4B:
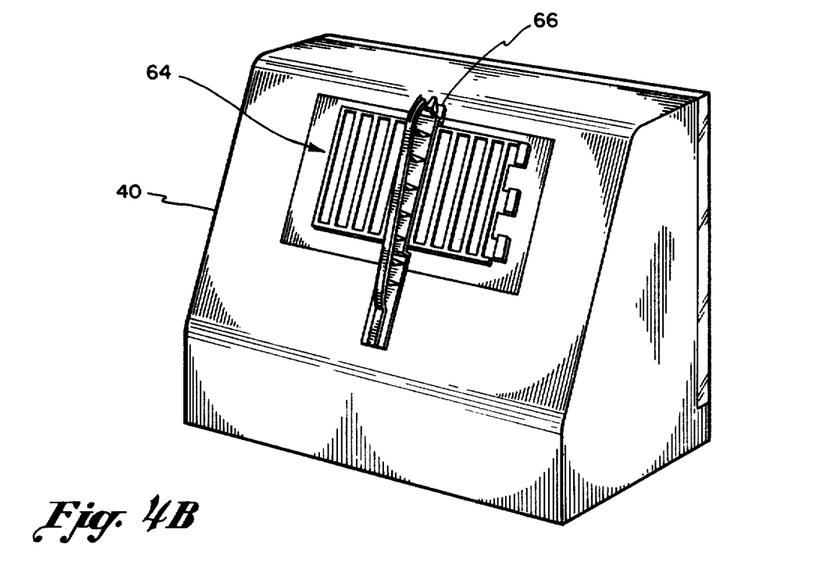
FIG. 4B is a rear, elevational view of the assembly depicted in FIG. 4A.

Mirror 36 is preferably front-coated float glass having an aluminized surface enhancement-coated to 94 percent or greater reflectivity as measured with a Viscor filter and a Weston photocell at an angle of incidence of 22.5 degrees. Flatness is 20/20 fringes as measured using a Davidson Fizeau interferometer with a two-inch diameter aperture. Flatness is expressed in fringes or power/irregularity.

The unitary optical assembly according to the invention includes rear projection screen means 38, which is located at the terminus of the optical path 33. Screen means 38 is shown as being vertically arranged for receiving the aerial image reflected by mirror 36 and displaying the image.

Screen 38 is preferably of the rear projection type as manufactured by Optical Sciences Group, San Rafael, Calif., and designated as type 192-679. An equivalent supplied by another manufacturer may as well be used. Screen 38 is preferably made of acrylic and has a lenticular surface on the inner side, and a fresnel surface facing the television receiver user. The frame 39 of screen 38 is preferably molded in one piece, using a high-impact polystyrene material.

The unitary optical assembly according to the invention further includes rigid, box-like shroud means 40, which has an open front for receiving screen 38, as depicted. Shroud 40 includes a back section slanted at the predetermined angle of mirror 36 for receiving and mounting mirror 36 at the predetermined angle and in predetermined fixed relation to screen 38. Shroud 40 includes an open bottom area 41 for access of optical path 33. Shroud 40 is also depicted as having closed sides and a closed top for shielding mirror 36 and the surface 42 of screen 38 from ambient light. The intrusion of ambient light could result in reduced contrast of the screened image, and visible patterns on the screen from random light rays hitting the rear surface.

The shroud 40 is preferably made of high-impact polystyrene formed in a pressure mold. The material is essentially a "structural foam" that provides strength and rigidity with light weight. The raw color as molded is preferably dark chocolate brown having minimum light reflectivity. The reflectivity may be further reduced by spray-painting the interior with a paint having a matte black finish. The exterior of the shroud may be finished with a texture paint having an appearance compatible with the cabinet 12.

The unitary optical assembly 22 according to the invention provides, by means of shroud 40, for maintaining mirror 36 and screen 38 in a predetermined fixed relationship one with the other. Further, when the unitary optical assembly 22 is elevated by the precision elevating means, shroud 40 provides for establishing and maintaining mirror 36 and screen in predetermined fixed relationship with the stationary optical assembly 26.

Figure 5A:
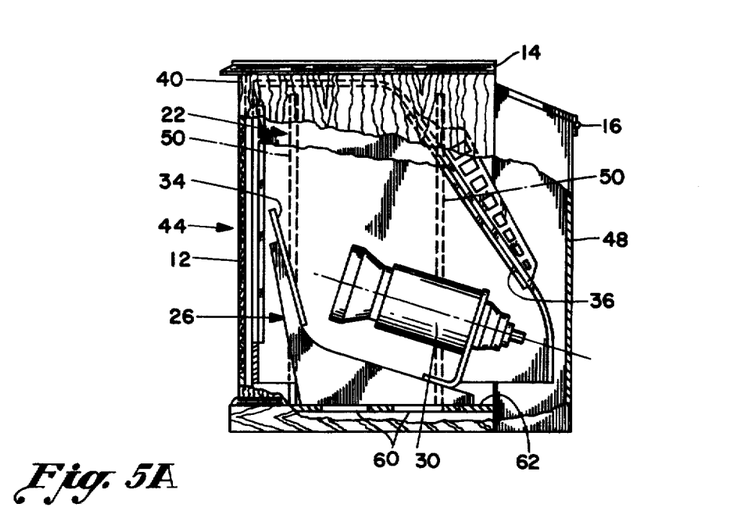
FIGS. 5A and 5B are side views in elevation wherein the receiver cabinet is cut away to depict the relationship of the unitary optical assembly according to the invention with the major receiver components when the screen is, respectively, stored and elevated.
Figure 5B:
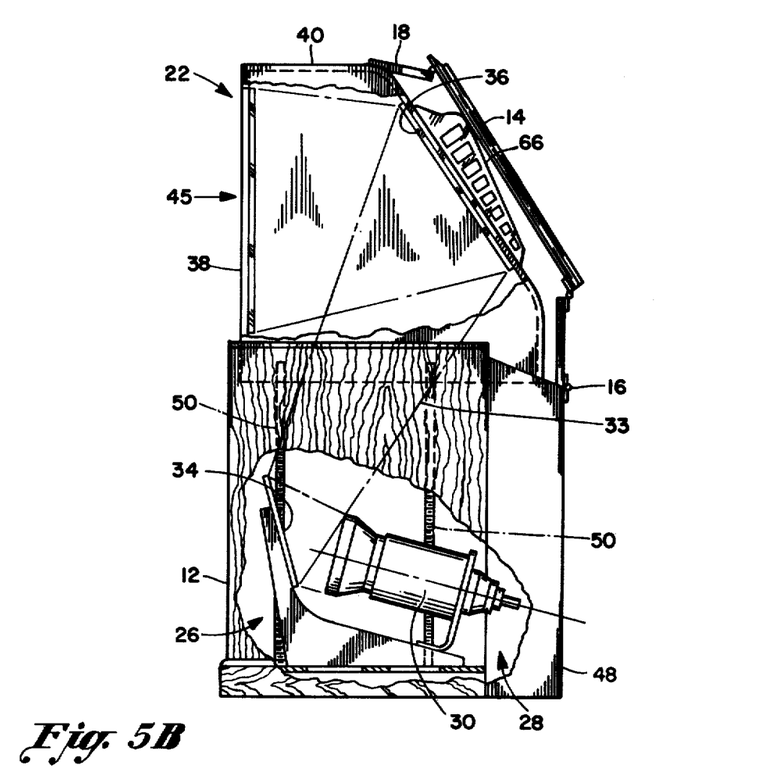

FIG. 5A depicts the location of the unitary optical assembly according to the invention when the receiver is in a first, receiver-inoperable position wherein the unitary optical assembly 22 is stored in cabinet 12. When the unitary optical assembly 22 is in this position, receiver 10 is substantially as compact as a conventional large-screen console television receiver. Means are provided for lifting lid 14 and unitary optical assembly 22 including associated screen 38 to a second elevated receiver-operable position 45 wherein screen 38 is emerged from cabinet 12; this configuration is depicted in FIG. 5B (and also by FIG. 3). When screen 38 is in the receiver-operable position, the receiver 10 is capable of displaying an image with an area greater than three times the image area on a conventional television receiver.

A conventional console television receiver normally has a picture tube with an imaging screen normally of twenty-five inch diagonal measure. The imaging area is about 300 square inches. The diagonal measure of screen 38 of the projection television receiver depicted is, by way of example, forty-five inches. The screen area, based upon a three-to-four aspect ratio, is about 970 square inches, or greater than three times the imaging area of the aforedescribed conventional large-screen console television receiver.

When unitary optical assembly 22 is fully emerged from cabinet 12, the length of the optical path 33 is equal to the aforedescribed projection distance, and the projected image is coincident with screen 38. Cabinet extension 48 provides additional space for enclosing shroud 40 when unitary optical assembly 22 according to the invention is stored in cabinet 12.

Figure 6:
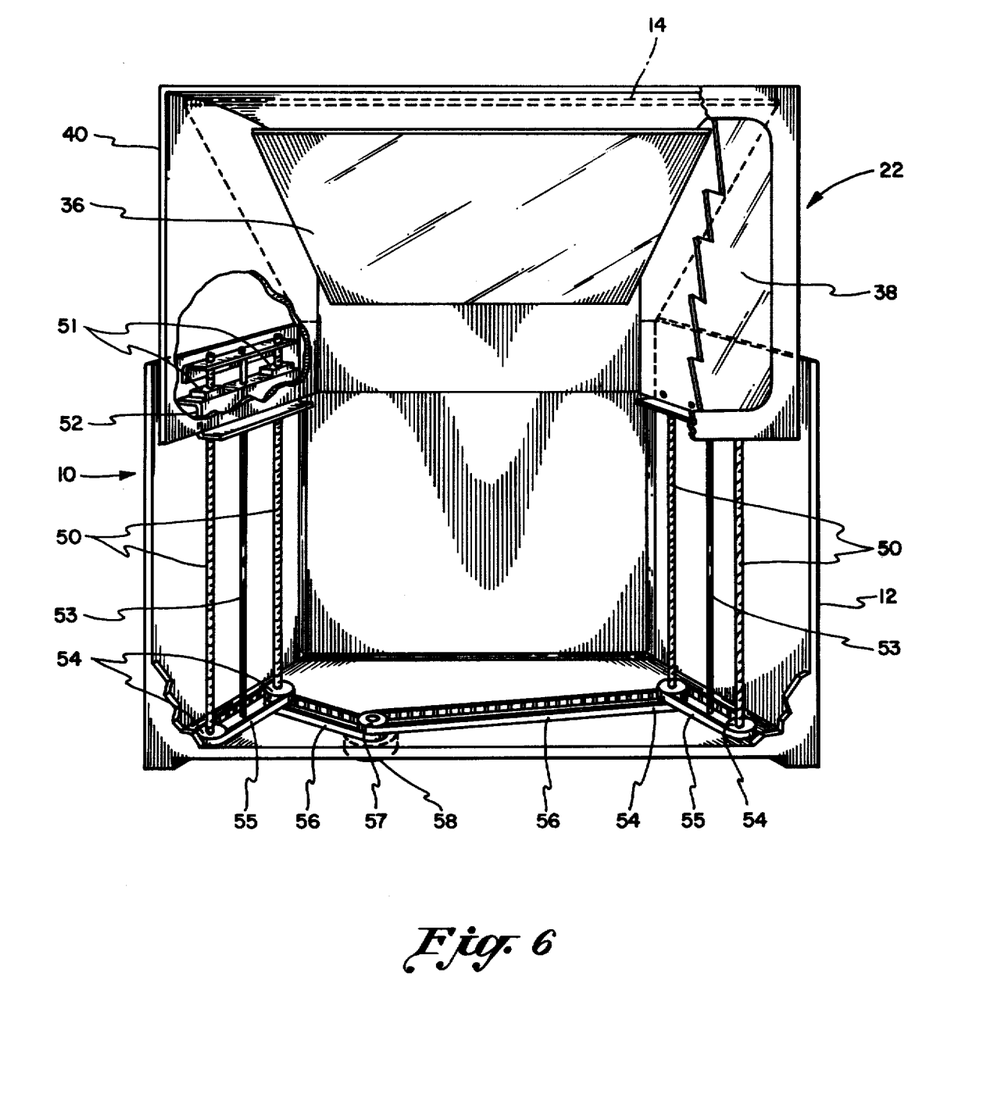
FIG. 6 is a perspective view of the receiver with the cabinet front and screen cut away to show details of the means for elevating and lowering the unitary optical assembly according to the invention.

FIG. 6 depicts means for lifting lid 14 (indicated by the dash lines) and elevating unitary optical assembly 22 from a first, receiver-inoperable position wherein screen 38 is stored in cabinet 12, to a second receiver-operable position wherein screen 38 is emerged from cabinet 12. Four vertically oriented and vertically stabilized screw means 50, for example, are shown as providing for elevating and lowering screen 38. Shroud 40 is shown as cut away in the left-hand side of FIG. 6 to show details of the elevating means; an identical mirror image assembly is located on the opposite side of the cabinet 12, but obscured by screen 38 and shroud 40.

The rotation of screw means 50 is translated into vertical movement by screw follower means 51 attached to bracket 52, to which shroud 40 is in turn attached. Guide rods 53 provide for vertically stabilizing shroud 40 in its vertical traverse. Screen 38 is depicted as being in its raised position.

Screw means 50 are caused to rotate in unison by power train means indicated as comprising screw means drive pulleys 54 which are caused to rotate in unison by drive pulley link belts 55. Drive pulleys 54 are in turn linked by belts 56 to drive pulleys 57 which are rotated by a reversible electrical motor 58. Belts 55 and 56 are depicted as being of the synchronous type for mating with synchronous pulleys 54 and 57, providing positive drive. The precision elevating means are fully described and claimed in the referent copending application Ser. No. 235,059.

The elevating of the unitary optical assembly 22 according to the invention and associated screen 38 from a stored, first receiver-inoperable position 44 wherein screen 38 is emerged from cabinet 12, results in a large influx of air into cabinet 12, and when unitary optical assembly 22 is lowered for storing, a large efflux of air. The volume of air entering or leaving cabinet 12 is considerable—about six cubic feet—and the rate of flow is about twenty-four cubic feet per minute on the basis that fifteen seconds is allotted for the full excursion of the screen out of, or into, cabinet 12. To provide for the unimpeded passage of air, a series of capacious vents 60 are provided in cabinet 12, preferably in the bottom 62 of cabinet 12 as indicated in FIG. 4A. A vent 64 is also preferably provided in shroud 40 as depicted in FIG. 4B. Vents 60 and 64 also provide for cooling of the cabinet interior by convection.

The affinity of particulate matter to electronic and optical components, especially those operating adjacent to high electrical potentials and at elevated temperatures, is well known. To remove as many contaminants as possible from the air entering the cabinet, it is desirable to provide filter means (not shown) in vents 60 and 64; these can be of the well known spun-glass type such as used in hot air furnaces.

The precision elevating means according to the invention provides for raising and lowering lid 14. A track 66 (please refer to FIGS. 4B and 5B) is located on the outside surface of the shroud 40. A track-follower means (not shown) is attached to the inner surface of lid 14. As shroud 40 is elevated and lowered, the track follower rides on the track 66 so that there is no friction between lid 14 and shroud 40 during elevating and lowering of the unitary optical assembly 22. Also, the lid lifting means prevents the lid 14 from falling backwards as the shroud 40 is elevated. Further, the track 66 is contoured to provide an initial quick rise of the lid as the screen emerges from the cabinet 12.

Exemplary dimensional heighth (H), width (W) and depth (D) values of the cabinet 12 of the projection television receiver 10 are listed as follows. It is to be recognized that the values are by way of example only, and are intended to be in no way limiting. The dimensional values are in inches.

| Cabinet (12) |
| --- |
| Screen stored: 33H × 44W × 19.5D |
| Cabinet Extension (48) |
| 26.5H × 42W × 8.5D |
| Lid (14) |
| 44W × 20D |
| Control Panel Cover (18) |
| 6H × 38W |
| Unitary Optical Assembly (22) |
| Shroud (40): 28H × 38W |
| Depth, at top: 12 |
| Depth, at bottom: 23.5 |
| Wall thickness: 0.25 |
| Mirror (36; a trapezoid) |
| Width, top: 21 |
| Width, bottom: 18 |
| Sides: 12 |
| Screen (36) Angle, with respect to vert.: 30° |
| Aspect ratio: 3 to 4 |
| Diagonal measure: 45 |
| Reciprocation distance: 24 |

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. For use in an ultra-compact projection television receiver housed in a cabinet, unitary optical assembly means selectively storable in said cabinet and elevatable therefrom by precision elevating means, said receiver including a stationary optical assembly means permanently enclosed in a lower portion of said cabinet for forming a television image and projecting, when said unitary optical assembly is elevated, an aerial image of said television image upwardly a predetermined image projection distance along an optical path folded by optical folding means, said unitary optical assembly comprising in combination:

mirror means arranged at a predetermined angle effective to receive said aerial image and reflect said image forwardly;

rear projection screen means located at the terminus of said optical path and vertically arranged for receiving said aerial image reflected by said mirror means for displaying said image;

rigid, box-like shroud means having an open front for receiving and mounting said screen means, and including means for mounting said mirror at said predetermined angle and in a predetermined fixed relationship with said screen means, said shroud means including an open bottom area for access of said optical path, and closed sides and top for shielding said mirror and said rear surface of said screen from ambient light;

such that said unitary optical assembly provides for maintaining said mirror and said screen in predetermined fixed relationship one with the other, and when said unitary optical assembly is elevated by said precision elevating means, said assembly provides for establishing and maintaining said mirror and said screen in predetermined fixed relationship with said stationary optical assembly means.

2. For use in an ultra-compact projection television receiver housed in a cabinet, unitary optical assembly means selectively storable in said cabinet and elevatable therefrom by precision elevating means, said receiver including a stationary optical assembly means permanently enclosed in a lower portion of said cabinet, and comprising three cathode ray picture tubes for forming a red, green and blue image respectively for projecting, in conjunction with associated projection lenses, aerial images of the television images upwardly a predetermined image projection distance along an optical path folded by optical path folding means, said unitary optical assembly comprising in combination:

mirror means arranged at a predetermined angle effective to receive said aerial image and reflect said image forwardly;

rear projection screen means located at the terminus of said optical path and vertically arranged for receiving said aerial image reflected by said mirror means for displaying said image;

rigid, box-like shroud means having an open front for receiving and mounting said screen means, and including means for mounting said mirror at said predetermined angle and in a predetermined fixed relationship with said screen means, said shroud means including an open bottom area for access of said optical path, and closed sides and top for shielding said mirror and said rear surface of said screen from ambient light;

such that said unitary optical assembly provides for maintaining said mirror and said screen in predetermined fixed, unitary relationship one with the other, and when said unitary optical assembly is elevated by said precision elevating means, said assembly provides for establishing and maintaining said mirror and said screen in predetermined fixed relationship with said stationary optical assembly means.

3. For use in an ultra-compact projection television receiver housed in a cabinet, unitary optical assembly means selectively storable in said cabinet and elevatable therefrom by precision elevating means, said receiver including a stationary optical assembly means permanently enclosed in a lower portion of said cabinet for forming a television image and projecting, when said unitary optical assembly is elevated, an aerial image of said television image upwardly a predetermined image projection distance along an optical path folded by optical folding means, said unitary optical assembly comprising in combination:

mirror means arranged at a predetermined angle effective to receive said aerial image and reflect said image forwardly;

rear projection screen means located at the terminus of said optical path and vertically arranged for receiving said aerial image reflected by said mirror means for displaying said image;

rigid, box-like shroud means having an open front for receiving and mounting said screen means, and including a back section slanted at said predetermined angle of said mirror for receiving and mounting said mirror at said predetermined angle and in a predetermined fixed relationship with said screen means, said shroud means including an open bottom area for access of said optical path, and closed sides and top for shielding said mirror and said rear surface of said screen from ambient light;

such that said unitary optical assembly provides for maintaining said mirror and said screen in predetermined fixed, unitary relationship one with the other, and when said unitary optical assembly is elevated by said precision elevating means, said assembly provides for establishing and maintaining said mirror and said screen in predetermined fixed relationship with said stationary optical assembly means.

* * * * *